United States Patent
Nallapa et al.

(10) Patent No.: US 9,187,085 B1
(45) Date of Patent: Nov. 17, 2015

(54) ELECTRIC VEHICLE CONTROL BASED ON OPERATING COSTS ASSOCIATED WITH POWER SOURCES

(71) Applicant: FORD GLOBAL TECHNOLOGIES, LLC, Dearborn, MI (US)

(72) Inventors: Venkatapathi Raju Nallapa, Dearborn, MI (US); Kerry Eden Grand, Chesterfield, MI (US); Fazal Urrahman Syed, Canton, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 17 days.

(21) Appl. No.: 14/260,412

(22) Filed: Apr. 24, 2014

(51) Int. Cl.
| | |
|---|---|
| B60W 20/00 | (2006.01) |
| B60L 11/18 | (2006.01) |
| B60W 10/06 | (2006.01) |
| B60W 10/08 | (2006.01) |
| B60W 10/26 | (2006.01) |

(52) U.S. Cl.
CPC ............ B60W 20/106 (2013.01); B60L 11/184 (2013.01); B60L 11/1848 (2013.01); B60L 11/1861 (2013.01); B60W 10/06 (2013.01); B60W 10/08 (2013.01); B60W 10/26 (2013.01); B60W 20/108 (2013.01); B60W 2510/244 (2013.01); B60W 2560/00 (2013.01); B60W 2900/00 (2013.01); Y10S 903/93 (2013.01)

(58) Field of Classification Search
CPC .............. B60W 20/106; B60W 20/108; B60L 11/1861; B60L 11/184; B60L 11/1848; Y10S 903/93; Y02T 90/14
See application file for complete search history.

(56) References Cited

U.S. PATENT DOCUMENTS

| | | | |
|---|---|---|---|
| 5,467,006 A | 11/1995 | Sims | |
| 5,627,752 A | 5/1997 | Buck et al. | |
| 5,778,326 A | 7/1998 | Moroto et al. | |
| 5,820,172 A | 10/1998 | Brigham et al. | |
| 7,013,205 B1 | 3/2006 | Hafner et al. | |
| 7,196,493 B2 * | 3/2007 | McGee et al. | 320/104 |
| 7,360,615 B2 | 4/2008 | Salman et al. | |
| 7,657,438 B2 | 2/2010 | Obayashi et al. | |
| 8,266,075 B2 | 9/2012 | Ambrosio et al. | |
| 8,326,470 B2 | 12/2012 | Mirle | |
| 2004/0074682 A1 | 4/2004 | Fussey et al. | |
| 2004/0110044 A1 * | 6/2004 | McArthur et al. | 429/13 |
| 2005/0228553 A1 | 10/2005 | Tryon | |
| 2009/0229900 A1 * | 9/2009 | Hafner et al. | 180/65.275 |
| 2009/0250277 A1 * | 10/2009 | Grand et al. | 180/65.265 |
| 2010/0292855 A1 | 11/2010 | Kintner-Meyer | |
| 2014/0117946 A1 * | 5/2014 | Muller et al. | 320/162 |

FOREIGN PATENT DOCUMENTS

JP          2011-000915 A    *   1/2011

* cited by examiner

*Primary Examiner* — Michael J Zanelli
(74) *Attorney, Agent, or Firm* — David B. Kelley; Brooks Kushman P.C.

(57) ABSTRACT

A plug-in hybrid electric vehicle operates the engine and/or traction motor in response to energy costs or prices received from an external source, such as a user or network. The vehicle can include a battery; an engine; an electric motor; a memory to store a battery charge point, and a controller to modify the battery charge point in response to arbitration criteria to control battery charging from the engine. The arbitration criteria can be based at least partially on fuel cost for the engine. The arbitration criteria can be based at least partially on electricity cost. The arbitration criteria can also include location of the vehicle. The controller may alter a deadband between charging the battery with the engine and discharging the battery to power the traction motor based on the arbitration criteria.

20 Claims, 6 Drawing Sheets

ELECTRIC VEHICLE CONTROL BASED ON OPERATING COSTS ASSOCIATED WITH POWER SOURCES

TECHNICAL FIELD

This disclosure relates to systems and methods for controlling operation of plug-in electric vehicles based on cost associated with at least two different power sources.

BACKGROUND

Plug-in hybrid electric vehicles (PHEVs) include a traction battery to store electric power used by a traction motor to propel the vehicle. The electric power may be provided by an external power source, such as the power grid, or an on-board power source, such as a fuel cell or internal combustion engine. In some vehicle architectures, the on-board power source may provide torque to the vehicle wheels alone or in combination with the traction motor, while in other architectures the on-board power source is only used to provide electric power to the battery and/or traction motor. The vehicle operating strategy that determine whether to power the vehicle using the traction battery, second power source, or both, is typically determined by the manufacturer during design and development to achieve desired fuel economy, vehicle performance, and maintain the traction battery within desired operating parameters, for example. While drivers may be provided the option to operate in an electric only, engine only, or various types of hybrid operating modes, these modes are generally designed to achieve the best fuel economy within the constraints imposed by the selected operating mode.

SUMMARY

A vehicle, systems, and methods for controlling a plug-in hybrid electric vehicle provide greater use of a fuel burning engine when the cost of fuel is low relative to the cost of electricity. If the cost of electricity is relatively low compared to the cost of fuel, then the use of plug-in charging can be increased.

A plug-in hybrid electric vehicle can include a traction battery, an engine (e.g., internal combustion engine), and an electric motor. The battery can be charged by the motor or by a plug-in to an electrical source. The vehicle can also include a memory to store a battery charge point at which the internal combustion engine provides motive force to generate electricity to charge the traction battery. The vehicle can also include a controller to modify the battery charge point in response to arbitration criteria to control battery charging from the engine. In an example, the arbitration criteria can be based at least partially on fuel cost for the engine. In an example, the arbitration criteria can be based at least partially on electricity costs. In an example, the arbitration criteria include location of the vehicle. In an example, the controller can alter a deadband of neither charging the battery with the internal combustion engine nor drawing power from the battery and can alter this deadband using the arbitration criteria.

A hybrid electric vehicle control method can include storing a battery charge point at which an engine begins charging a traction battery and outputting the battery charge point, in response to an arbitration of a price of fuel versus cost of electricity, to control traction battery charging from the engine. In an example, the modifying step can include using at least one of a fuel cost and an electricity price as the arbitration criteria. In an example, the modifying step includes using location of the vehicle as an input to the arbitration criteria.

A hybrid electric vehicle control method can include operating an engine at a first traction battery charge point associated with at least one of fuel cost and electricity cost and operating the engine at a second traction battery charge point different from the first traction battery charge point in response to a change in at least one of the fuel cost and the electricity cost. In an example, the control method can include receiving at least one of the fuel cost and the electricity cost from a wireless network.

In an example, the control method can include modifying at least one of the first traction battery charge point and the second traction battery charge point in response to location of the vehicle.

In an example, the control method can include reducing a battery state of charge threshold below which engine power is used to charge the traction battery.

In an example, the control method can include raising a battery state of charge threshold above which traction battery power is requested to power the motor in response to an increase in fuel cost relative to electricity cost.

In an example, the control method can include increasing a battery state of charge threshold below which engine power is used to charge the traction battery.

In an example, the control method can include raising a battery state of charge threshold above which traction battery power is requested to power the motor in response to a decrease in fuel cost relative to electricity cost.

A hybrid electric vehicle control method can include receiving electricity cost and fuel cost by a vehicle controller and delaying one of a traction battery charging request and a traction battery discharging request in response to the received electricity cost and fuel cost.

In an example, delaying a traction battery charging request can include reducing a battery state of charge threshold below which engine power is requested to charge the traction battery in response to an increase in fuel cost relative to electricity cost.

In an example, delaying a traction battery charging request can include increasing a battery state of charge threshold below which engine power is requested to charge the traction battery in response to a decrease in fuel costs relative to electricity price.

In an example, receiving electricity cost and fuel cost can include periodically receiving the electricity cost and the fuel cost from a wireless network.

In an example, the control method can include displaying a driver interface that prompts for entry of the electricity cost and the fuel cost.

In an example, the electricity cost and the fuel cost changes in response to vehicle location while charging the traction battery.

In an example, the control method can include delaying the traction battery charging request by increasing a battery state of charge threshold below which engine power is requested to charge the traction battery in response to vehicle location.

It will be appreciated that any of the above methods may be performed by the vehicle described herein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Fluctuations in energy prices are posing a variety of challenges to automotive customers with respect to purchasing and operating plug-in hybrid electric vehicles (PHEVs). During periods of higher gas prices, customers tend to favor more fuel efficient vehicles including PHEVs over larger and less efficient vehicles. However, in areas where electricity prices are comparatively higher, the cost of operating PHEVs can increase operating costs and reduce cost-savings. PHEV strategies that control under what operating conditions the engine or power source other than the traction battery is used are determined by the manufacturer during development and testing to meet various goals such as fuel efficiency, vehicle performance, and battery requirements, for example. These strategies typically do not consider operating costs associated with the different energy sources, such as electricity and gasoline, for example. The present disclosure describes systems and methods to cost efficiently use a plug-in hybrid electric vehicle, or any other vehicle having two on-board energy or fuel sources, by controlling operation of the vehicle based on the cost of the associated energy/fuel source.

The operating costs of a PHEV can be affected by adjusting the engine based battery power request in response to changes in prices of electricity and fuel, e.g., gasoline, diesel, natural gas propane, kerosene, bio-diesel, etc. The method described herein focuses on reducing the cost by increasing the amount of energy drawn from an external electrical source, e.g., the power grid using plug-in charger, during periods when the electrical energy is less expensive than fuel and increasing the amount of energy from the engine to propel the vehicle and/or to charge the battery when cost of electricity is higher than the cost of fuel.

Figure 1:
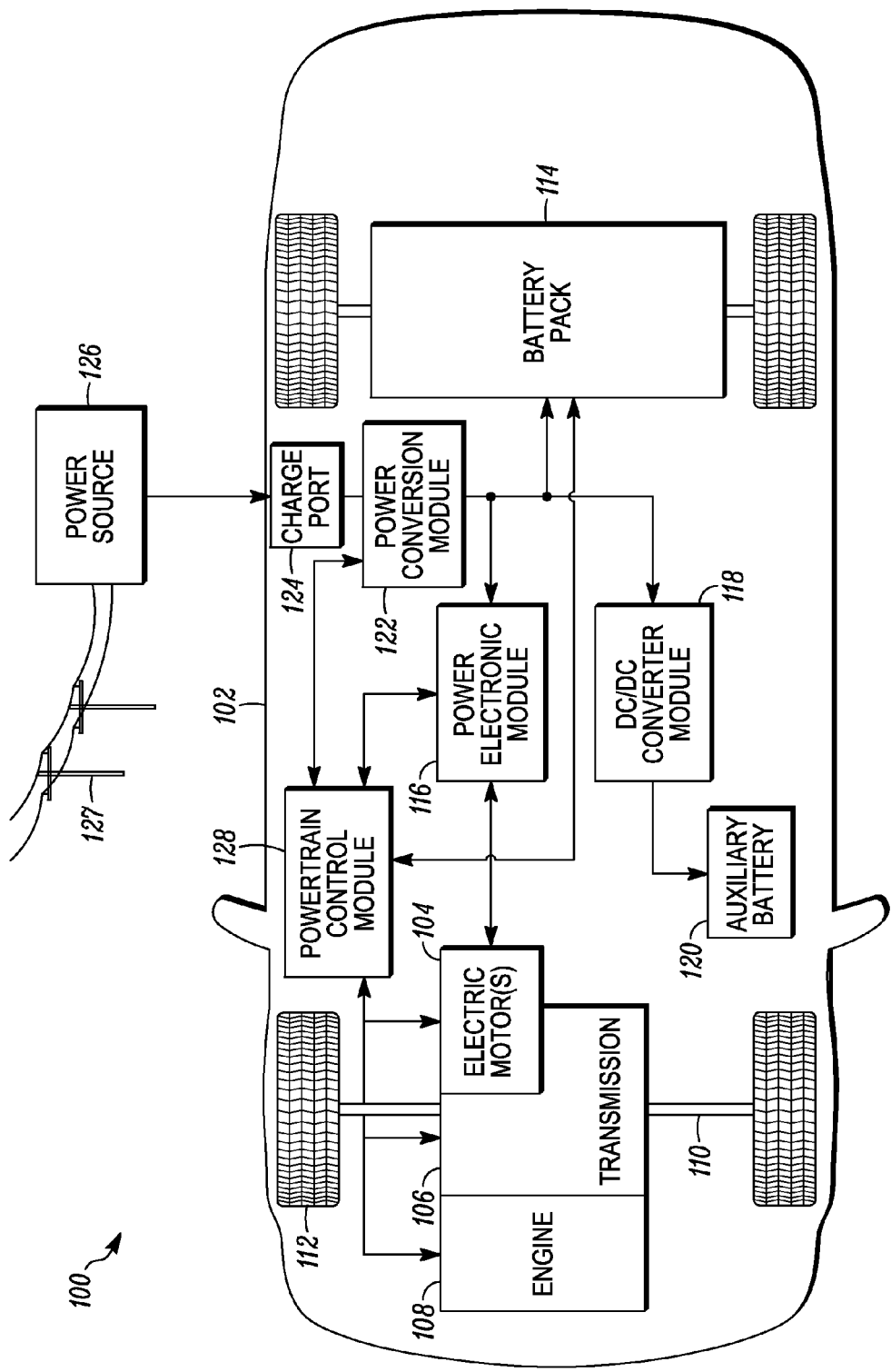
FIG. 1 is an example hybrid-electric vehicle with a battery pack.

FIG. 1 depicts an example of a hybrid-electric vehicle 102, e.g., plug-in hybrid-electric vehicle. A plug-in hybrid-electric vehicle 102 may comprise one or more electric motors 104 mechanically connected to a hybrid transmission 106. In addition, the hybrid transmission 106 is mechanically connected to an engine 108. Engine 108 may be an internal combustion engine that consumes a combustible fuel, e.g., gasoline, diesel, kerosene, natural gas, propane etc. The hybrid transmission 106 may also be mechanically connected to a drive shaft 110 that is mechanically connected to the wheels 112. The electric motors 104 can provide torque to the wheels when the engine 108 is turned on. The electric motors 104 consume electrical energy to provide torque to propel the vehicle 102. The electric motors 104 can provide deceleration capability when the engine 108 is turned off. The electric motors 104 may be configured as generators and can provide fuel economy benefits by recovering energy that would normally be lost as heat in the friction braking system. The electric motors 104 may also reduce pollutant emissions since the hybrid electric vehicle 102 may be operated in electric mode under certain conditions.

The traction battery or battery pack 114 stores energy that can be used by the electric motors 104. A vehicle battery pack 114 typically provides a high voltage DC output. The traction battery typically operates at over 100 volts which is an increased voltage in comparison to a conventional vehicle battery nominal voltage of 12-24 volts. Although not expressly defined in the National Electrical Code®, low voltage generally refers to less than 60 volts Direct Current (DC) and 30 volts Alternating Current (AC) calculated by root mean square (RMS), while voltages above this threshold are generally considered high voltage, although this convention may vary by geographic region or application. The traction battery also has greater current capacity in comparison to a conventional vehicle battery. This increased voltage and current is used by electric motor(s) 104 to convert the electrical energy stored in the battery to mechanical energy in the form of a torque which is used to provide vehicle propulsion.

The battery pack 114 is electrically connected to a power electronics module 116. The power electronics module 116 is also electrically connected to the electric motors 104 and provides the ability to bi-directionally transfer energy between the battery pack 114 and the electric motors 104. For example, a typical battery pack 14 may provide a DC voltage while the electric motors 104 may require a three-phase AC current to function. The power electronics module 116 may convert the DC voltage to a three-phase AC current as required by the electric motors 104. In a regenerative mode, the power electronics module 116 will convert the three-phase AC current from the electric motors 104 acting as generators to the DC voltage required by the battery pack 114. The methods described herein are equally applicable to a pure electric vehicle or any other device using a battery pack.

In addition to providing energy for propulsion, the battery pack 114 may provide energy for other vehicle electrical systems. A typical system may include a DC/DC converter module 118 that converts the high voltage DC output of the battery pack 114 to a low voltage DC supply that is compatible with other vehicle loads. Other high voltage loads, such as compressors and electric heaters, may be connected directly to the high-voltage bus from the battery pack 114. In a typical vehicle, the low voltage systems are electrically connected to a 12V battery 120. An all-electric vehicle may have a similar architecture but without the engine 108.

The battery pack 114 may be recharged by an external power source 126, e.g., the electrical power grid 127 at a rate that can be charged per kilowatt hour of power supplied to the battery 114 of the vehicle 102. The battery charge storage status can be measured as a state of charge (SOC). The external power source 126 may provide AC or DC power to the vehicle 102 by electrically connecting through a charge port 124. The charge port 124 may be any type of port configured to transfer power from the external power source 126 to the vehicle 102. The charge port 124 may be electrically connected to a power conversion module 122. The power conversion module may condition the power from the external power source 126 to provide the proper voltage and current levels to the battery pack 114. In some applications, the external power source 126 may be configured to provide the proper voltage and current levels to the battery pack 114 and the power conversion module 122 may not be necessary. The functions of the power conversion module 122 may reside in the external power source 126 in some applications. The vehicle engine, transmission, electric motors, battery, power conversion and power electronics may be controlled by a powertrain control module (PCM) 128.

Figure 2:
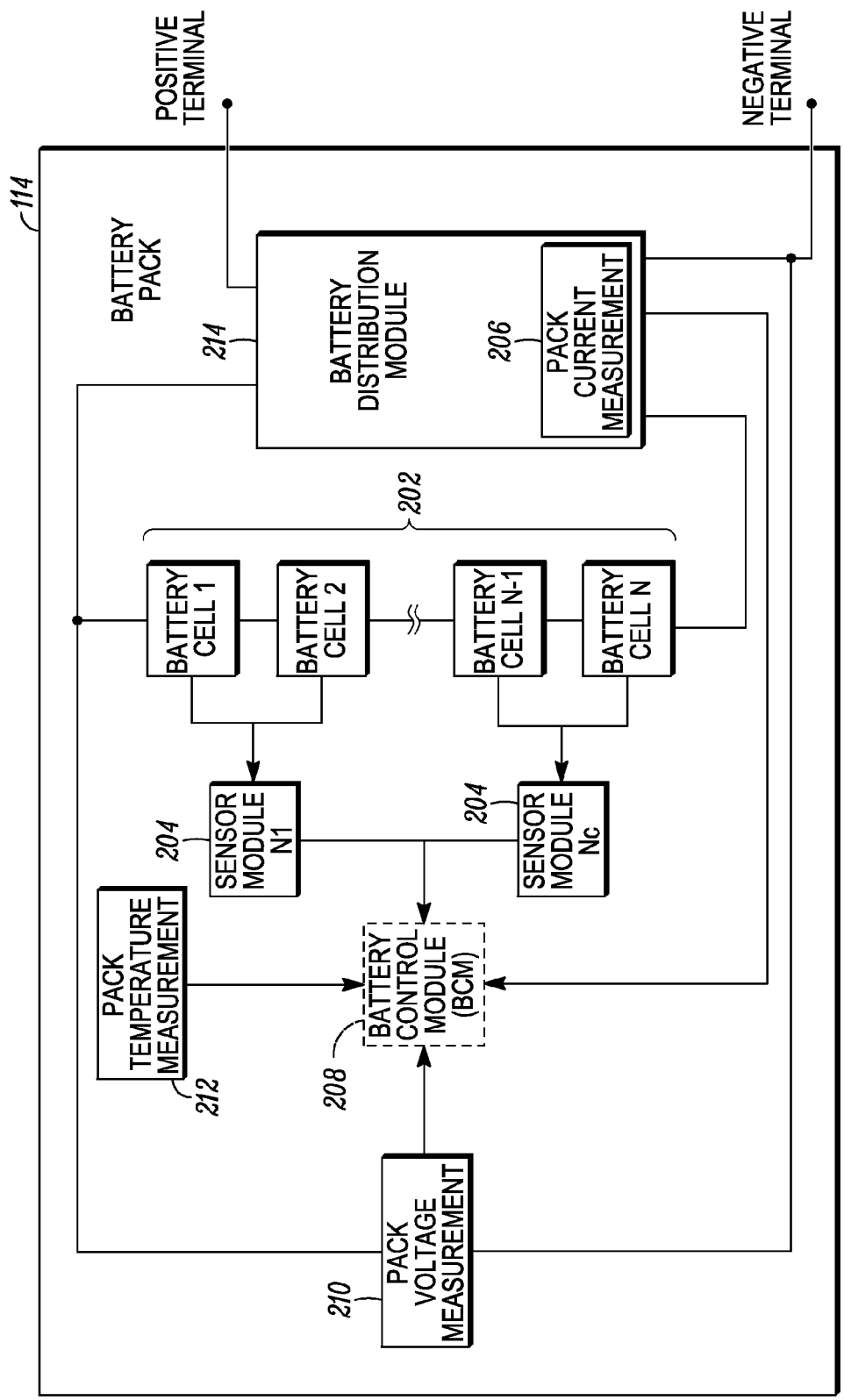
FIG. 2 is a battery pack arrangement comprised of battery cells and battery cell monitoring and controlling systems.

In addition to illustrating a plug-in hybrid vehicle, FIG. 1 can illustrate a battery electric vehicle (BEV) if engine 108 is removed. Likewise, FIG. 1 can illustrate a traditional hybrid electric vehicle (HEV) or a power-split hybrid electric vehicle if components 122, 124, and 126 are removed. FIG. 1 also illustrates the high voltage system which includes the electric motor(s), the power electronics module 116, the DC/DC converter module 118, the power conversion module 122, and the battery pack 114. The high voltage system and battery pack includes high voltage components including bus bars, connectors, high voltage wires, circuit interrupt devices, The individual battery cells within a battery pack may be constructed from a variety of chemical formulations. Typical battery pack chemistries may include but are not limited to lead acid, nickel cadmium (NiCd), nickel-metal hydride (NIMH), Lithium-Ion or Lithium-Ion polymer. FIG. 2 shows a typical battery pack 200 in a simple series configuration of N battery cell modules 202. The battery cell modules 202 may contain a single battery cell or multiple battery cells electrically connected in parallel. The battery pack, however, may be composed of any number of individual battery cells and battery cell modules connected in series or parallel or some combination thereof. A typical system may have one or more controllers, such as a Battery Control Module (BCM) 208 that monitors and controls the performance of the battery pack 200. The BCM 208 may monitor several battery pack level characteristics such as pack current measured by a current sensor 206, pack voltage 210 and pack temperature 212. A current sensor may utilize a variety of methods based on physical principles to detect the current including a Hall effect IC sensor, a transformer or current clamp, a resistor in which the voltage is directly proportional to the current through it, fiber optics using an interferometer to measure the phase change in the light produced by a magnetic field, or a Rogowski coil, for example. In the event a battery cell is charging or discharging such that the current entering or exiting the battery cell exceeds a threshold, the battery control module may disconnect the battery cell via the use of a circuit interrupt device (CID) such as a fuse or circuit breaker.

In addition to the pack level characteristics, there may be battery cell level characteristics that are measured and monitored. For example, the terminal voltage, current, and temperature of each cell may be measured. A system may use a sensor module 204 to measure the characteristics of one or more battery cell modules 202. The characteristics may include battery cell voltage, temperature, age, number of charge/discharge cycles, etc. Typically, a sensor module will measure battery cell voltage. Battery cell voltage may be voltage of a single battery or of a group of batteries electrically connected in parallel or in series. The battery pack 200 may utilize up to Nc sensor modules 204 to measure the characteristics of all the battery cells 202. Each sensor module 204 may transfer the measurements to the BCM 208 for further processing and coordination. The sensor module 204 may transfer signals in analog or digital form to the BCM 208. The battery pack 200 may also contain a battery distribution module (BDM) 214 which controls the flow of current into and out of the battery pack 200.

Figure 3:
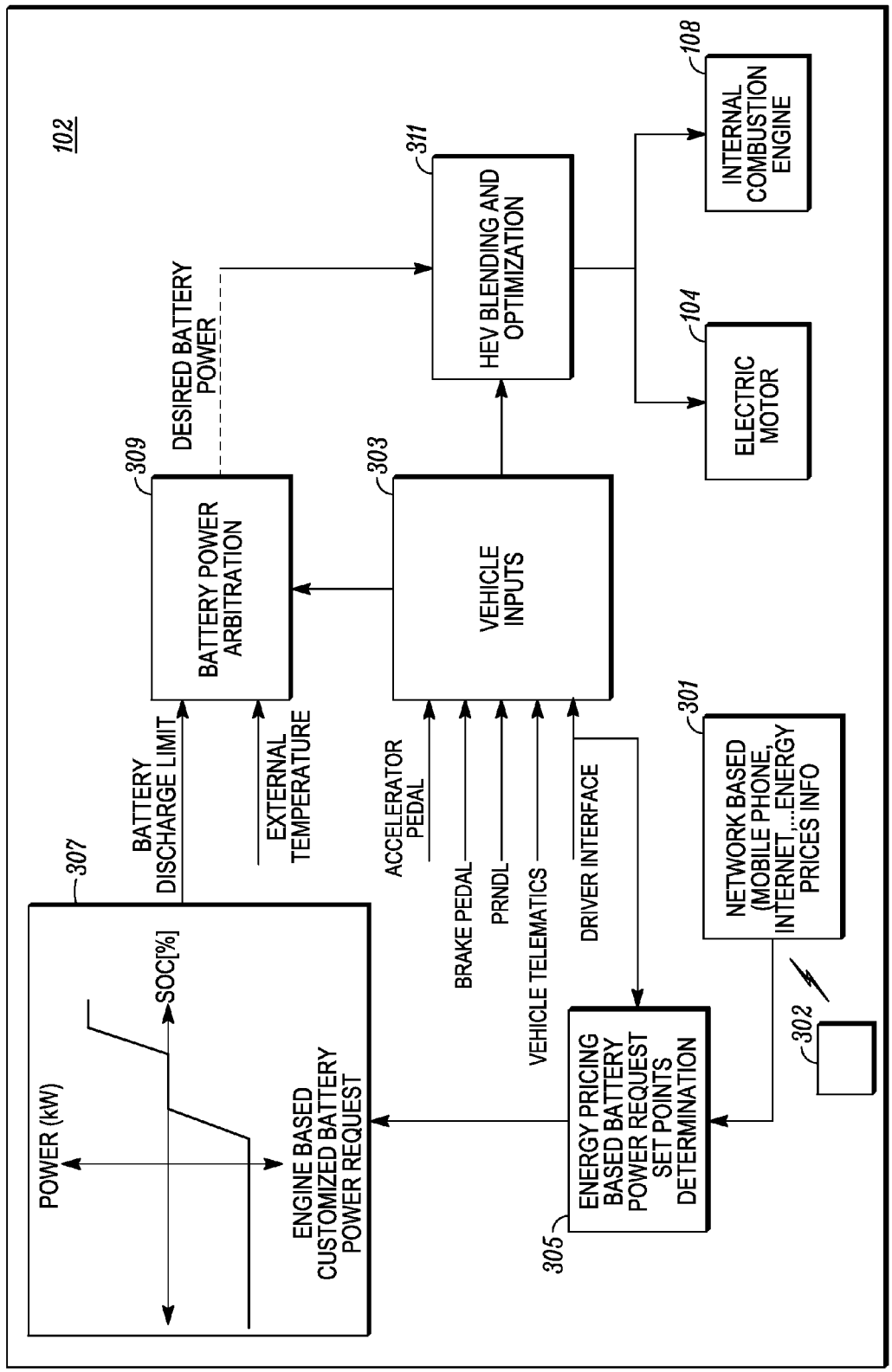
FIG. 3 is a schematic view of a hybrid electric vehicle in an example.

FIG. 3 is a schematic view of hybrid electric vehicle 102 that can include modules, which can include processing circuitry to execute instructions and methods steps and memory devices, also referred to as non-transitory computer readable storage media, to store data and/or instructions. Some or all of the operations set forth in the figures may be contained as a utility, program, subprogram, or other software, in any desired computer readable storage medium. In addition, the operations may be embodied by computer programs, which can exist in a variety of forms both active and inactive. For example, they may exist as software program(s) comprised of program instructions in source code, object code, executable code or other formats. Exemplary computer readable storage media include conventional computer system RAM, ROM, EPROM, EEPROM, and magnetic or optical disks or tapes. It is therefore to be understood that any electronic device capable of executing the above-described functions or modules may perform those functions, including dedicated electronic circuits, circuitry, integrated circuits or chips, etc. Once the circuitry stores or is loaded with the instructions the circuitry becomes a dedicated machine to execute the instructions. The various modules may be connected or functions may be performed in an order or sequence other than illustrated depending upon the particular application and implementation. Similarly, one or more functions or modules may be repeated and/or omitted under particular operating conditions or in particular applications, although not explicitly illustrated.

In one embodiment, the modules illustrated are primarily implemented by software, instructions, or code stored in a computer readable storage device or memory and executed by circuitry, one or more microprocessor-based computers or controllers to control operation of the vehicle based on cost of available energy sources. In one embodiment, an energy price module 301 receives energy price information from an external network. In another embodiment, energy price information is provided by a user via the driver interface. The energy price information includes the prices of one or more energy sources available for use in the particular application. In the representative embodiment illustrated, the energy price information includes the prices of fuel for the internal combustion engine and the price of electricity. This price information can be supplied or updated periodically, and the time period may be selected or specified by the user in some embodiments, e.g., hourly, daily, weekly, monthly, etc. The energy price information can be downloaded from the internet or other database. The information can also be loaded into a mobile communication device, such as a cellular telephone, and then input into the vehicle, either electronically or manually by the user via the driver interface. In another example, the energy price database is stored in an electronic system outside the vehicle.

A controller 305, which may be implemented in software and/or hardware as previously described, receives the energy price information and a user input to activate the controller 305 to determine power set points. The controller 305 operates to arbitrate selection and control of one or more vehicle energy sources based on the costs of fuel and the cost of electricity from the external source. The controller 305, using computing circuitry and memory circuitry, determines whether to supply more electrical energy from the internal combustion engine by operating the motor as a generator and charging the battery and/or providing electrical current direction to the traction motor to propel the vehicle when the price of fuel is relatively lower than the price of electricity from the external source. The fuel price can be a gallon or liter of gas, either at retail price, a discount price, a wholesale price or other pricing structure. The price of electricity can be the retail electrical grid price of a kilowatt-hour of electricity. Of course, energy cost information may be specified in a variety of formats or units and may be converted to various other equivalent formats or units depending on the particular application or implementation. For example, energy cost information may be automatically obtained during based on a location provided by a satellite navigation system, e.g., GPS, or cellular signal and associated cost information during refueling or recharging. Energy cost information may be provided or specified based on recognition of location, or information exchanged with a charging station, for example. Other types of electrical sources can include rates at electrical charging stations and/or work places, which may be specified by kilowatt-hour, or by minutes or hours charging or connected to a charging station, for example. Controller 305 sets or customizes the energy-based battery power request curve 307 based on the controller's arbitrated determination or relative cost differential between the fuel cost and the electrical energy cost. The controller 305 can set the curve 307 at any time electrical energy is needed to charge the battery or when there are price changes in the fuel cost or electricity cost, for example. From the curve 307 and the controller 305, the battery discharge limit is sent to the battery power arbitration module 309.

The vehicle inputs module 303 receives various inputs from the user and sensors in the vehicle. Example inputs include accelerator pedal input, which can represent a user's power request, and brake pedal input, which can represent a stop or speed reduction request by the user. Vehicle inputs module 303 may interface with or be integrated with vehicle telematics and receive data or signals from onboard sensors or downloaded from external sources. Other driver interface inputs are also possible. Examples include vehicle performance preferences, electrical motor usage, battery settings, trip information, etc. The gear selection or automatic transmission positions (PRNDL) may also be provided as vehicle inputs to module 303. The inputs to module 303 can be selectively sent to the controller 305, the battery power arbitration module 309 and the hybrid electric vehicle blending and optimization module 311. The driver interface may include one or more types of input and/or output devices such as a touch screen with programmable inputs, switches, buttons, knobs, etc. to manually enter energy price information and/or control various types of user settings that affect control of the engine and or motors based on energy costs.

The battery power arbitration module 309 also receives the external temperature as an input along with the vehicle inputs from module 303 and the battery discharge limits from the set curve 307. The battery power arbitration module 309 determines the desired battery power using its inputs. The desired battery power is output to the blending and optimization module 311. It will be recognized that the battery power arbitration module 309 and HEV blending and optimization module 311 can be part of the power electronics module 116. The HEV blending and optimization module 311 can send signals to the electric motor 104 and the engine 108 to control operation of both.

Figure 4:
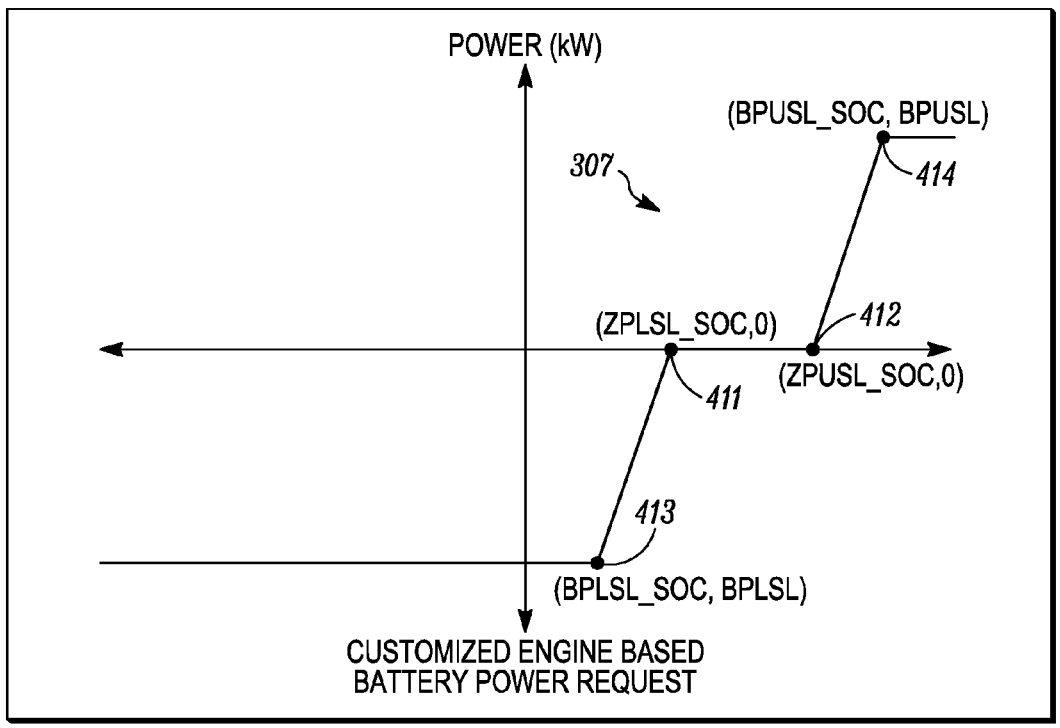
FIG. 4 is a graph depicting operation of a system or method for an example hybrid electric vehicle.

FIG. 4 is a graph of electrical power requested curve 307 from the engine to provide electrical power from on-board power sources within the vehicle. The graph has an X-axis of state of charge (SOC) and a Y-axis of requested battery power. In an example, the engine drives a motor to produce electrical energy for storage in the battery or for supplying current directly to another motor to propel the vehicle at certain set points on the curve 307. The curve 307 is a linear function as shown with a plurality of set points, here, four distinct set points 411, 412, 413, and 414. There is a deadband where no energy is requested from the battery between the zero power lower saturation limit set point 411 and the zero power upper saturation limit set point 412. The band between the zero power lower saturation limit (ZPLSL) set point 411 and the battery power lower saturation limit (BPLSL) set point 413 has the battery 114 being charged by the engine 108, e.g., a charging request. In this example, the battery power lower saturation limit (BPLSL) range begins at set point 414 and extends to a SOC of zero. This is the lowest power that can be requested by the vehicle control system and it has a lower SOC relative to the battery power request slope between the set points 411 and 413. In this example, the battery power upper saturation limit begins at set point 414. This is the peak power that can be requested by the vehicle control system and it requires a higher SOC relative to the battery power request slope between the set points 412 and 414. In an example, the set point 411 can be set at 30% SOC and zero power. In an example, the set point 412 can be set at 70% SOC and zero power. In an example, the set point 413 can be set at 10% SOC and negative 10 kWatts. In an example, the set point 414 can be set at 80% SOC and positive 10 kWatts power.

Figure 5:
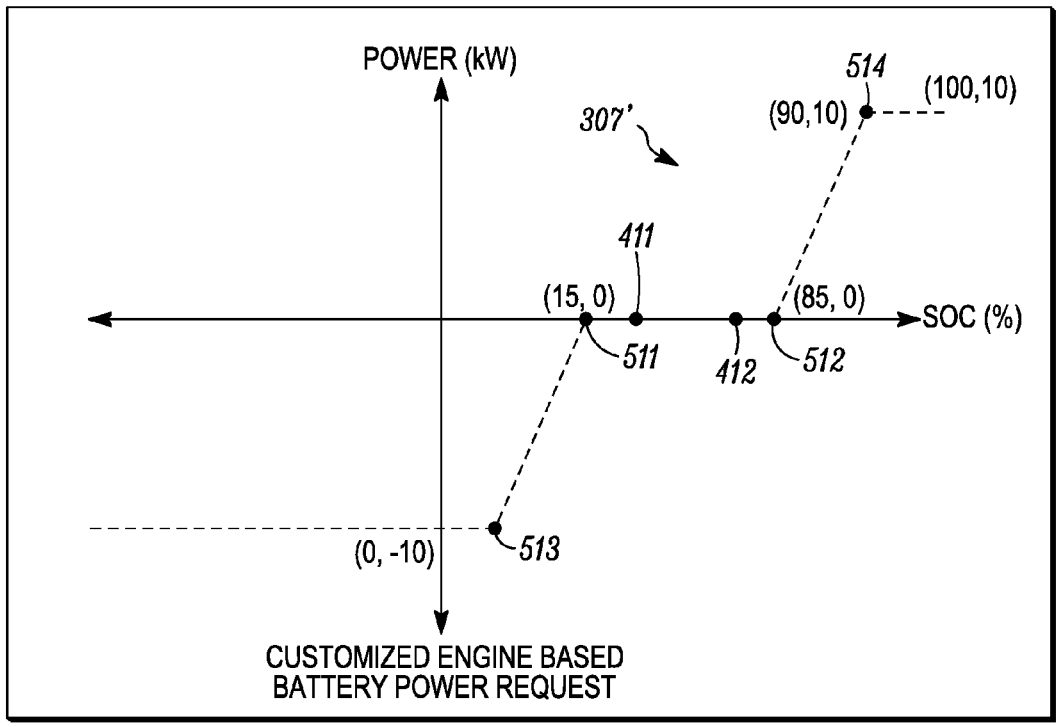
FIG. 5 shows an operation graph for an example hybrid electric vehicle.

FIG. 5 is a graph of electrical power curve 307' from the engine to provide electrical power within the vehicle that differs from the FIG. 4 example in that there is a difference in fuel pricing and/or electricity pricing. In the representative example illustrated in FIG. 5, the price of fuel has increased relative to the price of fuel from FIG. 4. As a result, the system as described herein changes the battery power request curve or function as implemented in the present modules. The zero power lower saturation limit set point 511 and the zero power upper saturation limit set point 512 are changed from the default zero power lower saturation limit set point 411 and the default zero power upper saturation limit set point 412. In this example, the deadband at the zero power request is increased in length. In an example, the zero power lower saturation limit set point 511 is set at 15% SOC, i.e., lower than the FIG. 4 setpoint 411, e.g., a 30% SOC. In an example, the zero power lower saturation limit set point can be reduced by half when the price of fuel increases. In an example, the zero power upper saturation limit set point 512 is set at 85% SOC, i.e., higher than the FIG. 4 setpoint 412, e.g., a 70% SOC. In an example, the zero power upper saturation limit (ZPUSL) set point can be increased by a rate of about 20% to from 70% SOC to 85% SOC when the price of fuel increases. In an example, the setpoints 513 and 514 can remain the same as setpoints 413 and 414. The battery power lower set limit (BPLSL) set point 513 can be decreased on the X-axis to a less than 10% SOC but the maximum charging power that can be requested from the engine to the battery will remain the same. The slope of the power request function from 512 to 514 can remain the same as the slope of the power request function shown between setpoints 412 to 414 (FIG. 4). The battery power upper saturation limit (BPUSL) set point 514 can be increased on the X-axis to a 90% SOC but the maximum power that can be requested from the battery will remain the same. The slope of the charge request function from 511 to 513 can remain the same as the slope of the charge request function shown between setpoints 411 to 413 (FIG. 4). The fuel price increase can be relative to the price of electricity or an absolute change in the price of fuel on its own.

Figure 6:
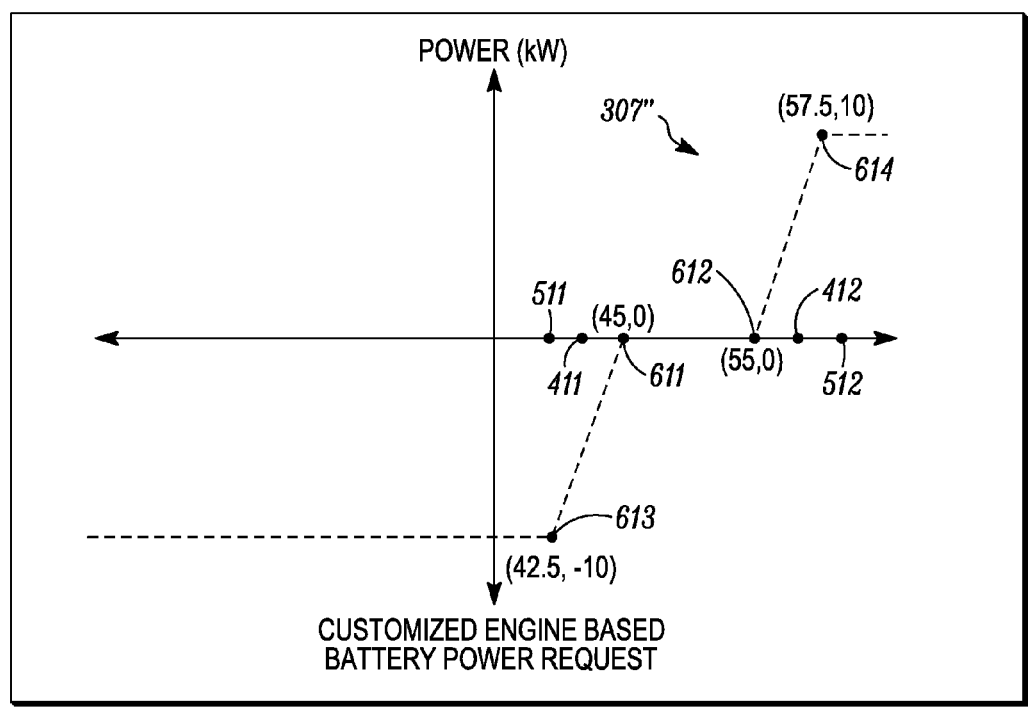
FIG. 6 shows an operation graph for an example hybrid electric vehicle.

FIG. 6 is a graph of an electrical power curve 307″ from the engine to provide electrical power within the vehicle that differs from the examples of FIGS. 4 and 5 in that there is a further difference in fuel pricing and/or electricity pricing. In the representative example illustrated in FIG. 6, the price of fuel has decreased relative to both of the above examples of FIGS. 4 and 5. As a result, the system as described herein changes the battery power request curve or function as implemented in the present modules to use more fuel to charge the battery and power the vehicle. In this example, the deadband is decreased relative to the above two examples. The zero power lower saturation limit set point 611 and the zero power upper saturation limit set point 612 are increased and decreased, respectively. This will increase the engine based battery power for both charging the battery and power the electric motor. In an example, zero power lower saturation limit set point 611 is set at 45% SOC. In an example, zero power upper saturation limit set point 612 is set at 55% SOC. As a result the no power requested from the internal combustion engine state, e.g., the deadband, is only in the range of 45% SOC and 55% SOC. That is, the deadband range is one seventh the deadband range of the FIG. 5 example. This curve 307″ can also change the setpoints 613 and 614. The battery power lower set limit set point 613 can be decreased on the X-axis to a less than 10% SOC but the maximum charging power that can be requested from the engine to the battery will remain the same. In an example, the set point 613 is set at 42.5% SOC. The slope of the power request function from 512 to 514 can remain the same as the slope of the power request function shown between setpoints 412 to 414 (FIG. 4) or can have a greater slope. The battery power upper saturation limit set point 614 can be decreased on the X-axis to a 57.5% SOC but the maximum power that can be requested from the battery will remain the same. The slope of the charge request function from 511 to 513 can remain the same as the slope of the charge request function shown between setpoints 411 to 413 (FIG. 4) or can be greater. The fuel price increase can be relative to the price of electricity or an absolute change in the price of fuel on its own.

The above examples show fixed points of engine electricity demand for either powering the vehicle or charging the battery. It is within the scope of the present disclosure to allow the set points to be adjustable to readjust the deadband. The user of the vehicle can adjust the use of the engine for generation of electricity. In an example, the user can select that the vehicle use the engine to generate more electricity regardless of price, e.g., out of environmental concerns or based on location of the vehicle, for example.

Figure 7:
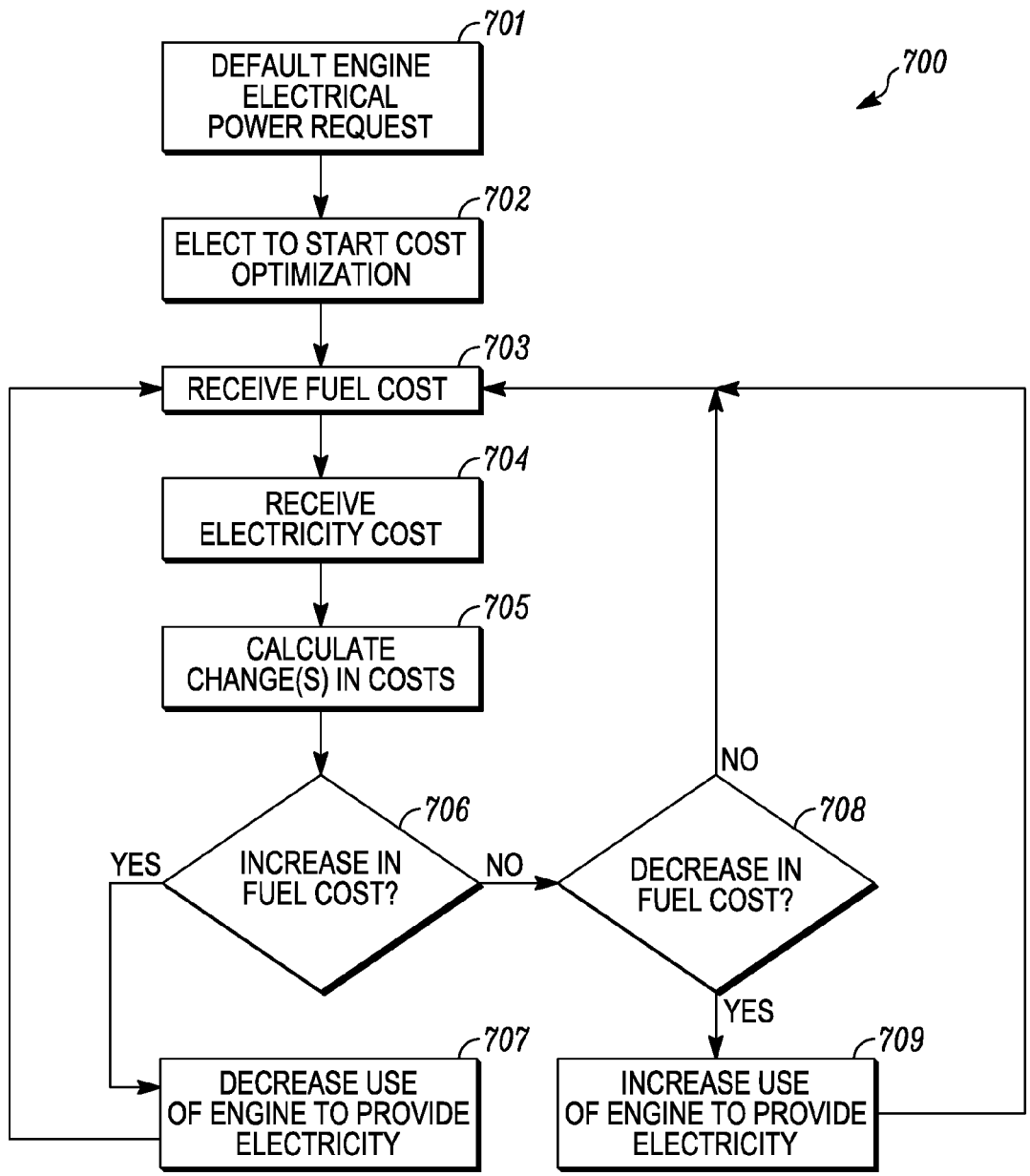
FIG. 7 shows operation of a system or method for controlling a hybrid electric vehicle.

FIG. 7 is a flowchart of a method 700 for controlling vehicle operation based on energy costs of a vehicle having two or more energy sources, such as a plug-in hybrid electric vehicle having fuel for an engine and electric power for a traction motor, with electric power provided from the engine, or from an external battery charging source. At 701, the modules (circuitry, electronics, software, etc.) of the vehicle store the default electrical power request that defines the engine's contribution to the electrical load of the vehicle. In an example, the engine's electrical power request in its default settings can be represented by the graph shown in FIG. 4. At 702, the energy-cost based control is started. The user can select this feature, e.g., at an interface on the vehicle or elected at an external device that communicates with the vehicle, e.g., a computer, mobile phone, tablet, or other communication device.

At 703, the energy cost for one or more energy sources is received. The vehicle can receive the energy or fuel cost from the operator via a vehicle or driver interface, or electrically or wirelessly from a network. In another example, the fuel costs are received at a computing device remote from the vehicle and transferred by the computing device to a receiver within the vehicle using a wired and/or wireless connection. At 704, the electricity costs are received. The electricity costs can be received directly by the vehicle from a wired or wireless network such as the internet using WiFi, Bluetooth, CDMA, or similar communication protocol, via a charging cord connected to a charging station, or from a user via a driver interface or a remote computing device, such as a cell phone, for example. In another example, the electricity costs are received by a computing device remote from the vehicle. The costs can also be associated with a particular geographic region or location, such as the home and work locations of the user of the vehicle. The costs can also be related to the location of the vehicle itself during charging of the battery from an external source. At 705, the cost changes are calculated. The current fuel cost and electricity cost are compared to one or more historical costs, which can be stored in memory located on the vehicle or in a computing device. The fuel cost and electricity costs can be compared to each other to elect to use more of the lower cost energy source.

At 706, it is determined whether there is an increase in fuel cost. If yes, then the vehicle may decrease the use of the fuel consuming engine in favor of electrical energy provided by the external power source and regenerative braking that is stored in the battery. In an example, the engine provided electrical power function is altered, e.g., from either the FIG. 4 graph 307 to the FIG. 6 graph 307″ or the FIG. 5 graph 307′ to either the FIG. 4 graph 307 or the FIG. 6 graph 307″ to reduce the use of fuel to provide electrical power to charge the battery or propel the vehicle, e.g., the SOCs at which the engine is triggered to produce electricity and/or propel the vehicle are expanded and the deadband increases. The process flow then can return to step 703. If at 706, fuel cost or electrical cost does not increase, then at 708 it is determined whether fuel cost or electrical cost decreases. If no, then the process returns to step 703. If fuel costs have decreased, then at 709 the use of fuel to provide electrical energy in the vehicle, and specifically to the battery, is increased. In an example, the engine provided electrical power function is altered, e.g., from either the FIG. 6 graph 307″ to either of the FIG. 4 graph 307 or the FIG. 5 graph 307′ to increase the use of fuel to provide electrical power to charge the battery, e.g., the SOCs at which the engine is triggered to produce electric are decreased and the deadband decreases.

While the method 700 shows a strategy focused on fuel costs, a similar type of process can be used for electricity costs. The cost of electricity is received. If the cost of electricity drops, then the use of electricity from an external source is increased. If the cost of electricity rises, then the use of fuel can be increased. The cost of fuel and the cost of electricity are arbitration criteria used by processes, systems, modules and devices to determine whether to increase the use of fuel, decrease the use of fuel, increase the use of external electricity or decrease the use of external electricity.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules may be implemented as hardware circuitry, optical components, single or multi-processor circuits, memory circuits, software program modules and objects, firmware, and combinations thereof, as appropriate for particular implementations of various embodiments.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic data tape storage, optical data tape storage, CDs, RAM devices, FLASH devices, MRAM devices and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers, or any other hardware components or devices, or a combination of hardware, software and firmware components.

Although exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

Although various embodiments may have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A plug-in hybrid electric vehicle, comprising:
a battery;
an engine;
an electric motor electrically connected to the battery;
a memory to store a battery charge set point, fuel cost, and electricity cost; and
a controller to control operation of the engine and the electric motor based on the fuel cost and electricity cost, wherein the controller modifies the battery charge set point based at least partially on fuel cost.

2. The electric vehicle of claim 1, wherein the controller modifies the battery charge set point based at least partially on the electricity cost.

3. The electric vehicle of claim 1, wherein the controller modifies the battery charge set point based at least partially on location of the vehicle.

4. The electric vehicle of claim 1, wherein the controller is configured to alter a deadband associated with the battery being free from both charging by the engine and drawing power therefrom in response to a change in at least one of fuel cost or electricity cost.

5. A method for controlling a hybrid electric vehicle comprising:
operating an engine at a first fraction battery charge point associated with at least one of fuel cost and electricity cost; and
operating the engine at a second traction battery charge point different from the first traction battery charge point in response to a change in at least one of the fuel cost and the electricity cost.

6. The method of claim 5, further comprising receiving at least one of the fuel cost and the electricity cost from a wireless network.

7. The method of claim 5, further comprising modifying at least one of the first traction battery charge point and the second traction battery charge point in response to location of the vehicle.

8. The method of claim 5, further comprising:
reducing a battery state of charge threshold below which engine power is used to charge the traction battery.

9. The method of claim 5, further comprising:
raising a battery state of charge threshold above which traction battery power is requested to power a motor in response to an increase in fuel cost relative to electricity cost.

10. The method of claim 5, further comprising:
increasing a battery state of charge threshold below which engine power is used to charge the traction battery.

11. The method of claim 5, further comprising:
raising a battery state of charge threshold above which traction battery power is requested to power a motor in response to a decrease in fuel cost relative to electricity cost.

12. A plug-in hybrid electric vehicle control method, comprising:
receiving electricity cost and fuel cost by a vehicle controller; and
delaying one of a traction battery charging request and a traction battery discharging request in response to the received electricity cost and fuel cost.

13. The method of claim 12, wherein delaying a traction battery charging request comprises reducing a battery state of charge threshold below which engine power is requested to charge the traction battery in response to an increase in fuel cost relative to electricity cost.

14. The method of claim 12, wherein delaying a fraction battery charging request comprises increasing a battery state of charge threshold below which engine power is requested to charge the fraction battery in response to a decrease in the fuel cost relative to electricity price.

15. The method of claim 12 wherein receiving electricity cost and fuel cost comprises periodically receiving the electricity cost and the fuel cost from a wireless network.

16. The method of claim 12 further comprising displaying a driver interface that prompts for entry of the electricity cost and the fuel cost.

17. The method of claim 12 wherein the electricity cost and the fuel cost are based on vehicle location while charging the traction battery.

18. The method of claim 12 further comprising delaying the fraction battery charging request by increasing a battery state of charge threshold below which engine power is requested to charge the fraction battery in response to vehicle location.

19. A plug-in hybrid electric vehicle, comprising:
a battery;
an engine;
an electric motor electrically connected to the battery;
a memory to store a battery charge set point, fuel cost, and electricity cost; and
a controller to control operation of the engine and the electric motor based on the fuel cost and electricity cost, wherein the controller modifies the battery charge set point based at least partially on location of the vehicle.

20. The vehicle of claim 19, wherein the controller modifies the battery charge set point based at least partially on fuel cost for the engine, at least partially on electricity cost or both.

* * * * *